United States Patent
Park

(10) Patent No.: US 12,339,414 B2
(45) Date of Patent: Jun. 24, 2025

(54) HYBRID RESIDUAL MOVEOUT ERROR ESTIMATION

(71) Applicant: ExxonMobil Technology and Engineering Company, Spring, TX (US)

(72) Inventor: Jaewoo Park, The Woodlands, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 1360 days.

(21) Appl. No.: 16/773,604

(22) Filed: Jan. 27, 2020

(65) Prior Publication Data

US 2020/0271810 A1    Aug. 27, 2020

Related U.S. Application Data

(60) Provisional application No. 62/809,129, filed on Feb. 22, 2019.

(51) Int. Cl.
*G01V 1/50*        (2006.01)

(52) U.S. Cl.
CPC ............ *G01V 1/50* (2013.01); *G01V 2210/52* (2013.01); *G01V 2210/6222* (2013.01); *G01V 2210/66* (2013.01)

(58) Field of Classification Search
CPC .................. G01V 1/50; G01V 2210/52; G01V 2210/6222; G01V 2210/66
See application file for complete search history.

(56) References Cited

U.S. PATENT DOCUMENTS

| | | | |
|---|---|---|---|
| 7,804,739 B2 | 9/2010 | Siliqi et al. |
| 9,476,996 B2 | 10/2016 | Pica et al. |
| 9,482,770 B2 | 11/2016 | Sun |
| 9,702,999 B2 | 7/2017 | Sun et al. |
| 9,804,281 B2 | 10/2017 | Willis et al. |
| 9,869,783 B2 | 1/2018 | Jin et al. |
| 2014/0301165 A1 | 10/2014 | Nichols et al. |
| 2017/0176617 A1 | 6/2017 | Colombo et al. |

OTHER PUBLICATIONS

SEG Wiki, Velocity Analysis, https://wiki.seg.org/wiki/Velocity_analysis (Year: 2023).*

(Continued)

*Primary Examiner* — Hyun D Park
(74) *Attorney, Agent, or Firm* — ExxonMobil Technology and Engineering Company - Law Department

(57) ABSTRACT

A method and apparatus for estimating RMO error, including obtaining input data comprising a domain of picking locations; running a plurality of residual moveout (RMO) error-picking algorithms with the input data; for each of the plurality of RMO error-picking algorithms, flattening gathers based on the respective RMO error-picking algorithms to generate a resultant error pick; comparing the resultant error picks from the plurality of RMO error-picking algorithms at each picking location in the domain of picking locations; and assembling a set of final RMO error picks from the resultant error picks from the plurality of RMO error-picking algorithms at each picking location.

23 Claims, 11 Drawing Sheets

(56) References Cited

OTHER PUBLICATIONS

Michelioudakis et al., "Uncertainty analysis of depth predictions from seismic reflection data using Bayesian statistics", Geophys. J. Int. (2018) 213, 2161-2176 (Year: 2018).*
Gulunay et al., "Gather flattening based on event tracking for each time sample," Rome 2008, Leveraging Technology.*
DUG Insight 4 User Manual (2018) "Full Volume Parabolic RMO Picking," http://help.dugeo.com/m/Insight4-0/I/438829-full-volume-parabolic-rmo-picking.com, 4 pages.
Gamar-Sadat, F. et al. (2013) "Velocity Model Building using Dense RMO Picking for Variable-Depth Streamer Data," *75th EAGE Conf. & Exh., SPE Europe*, London, UK, Jun. 10-13, 2013, 5 pgs.
Hale, Dave (2009) "Structure-Oriented Smoothing and Semblance," *Center for Wave Phenomena, Colorado School of Mines*, CWP-635, Golden, CO., 10 pages.
Hinkley, D. et al. "Prestack Gather Flattening for AVO," *SEG Int'l Exp., 74th Mtg.*, Denver, CO, Oct. 10-15, 2004, 3 pages.
Neidell, N. S. et al. (1971) "Semblance and Other Coherency Measures for Multichannel Data," *Geophysics*, v.36, No. 3, pp. 482-497.

* cited by examiner

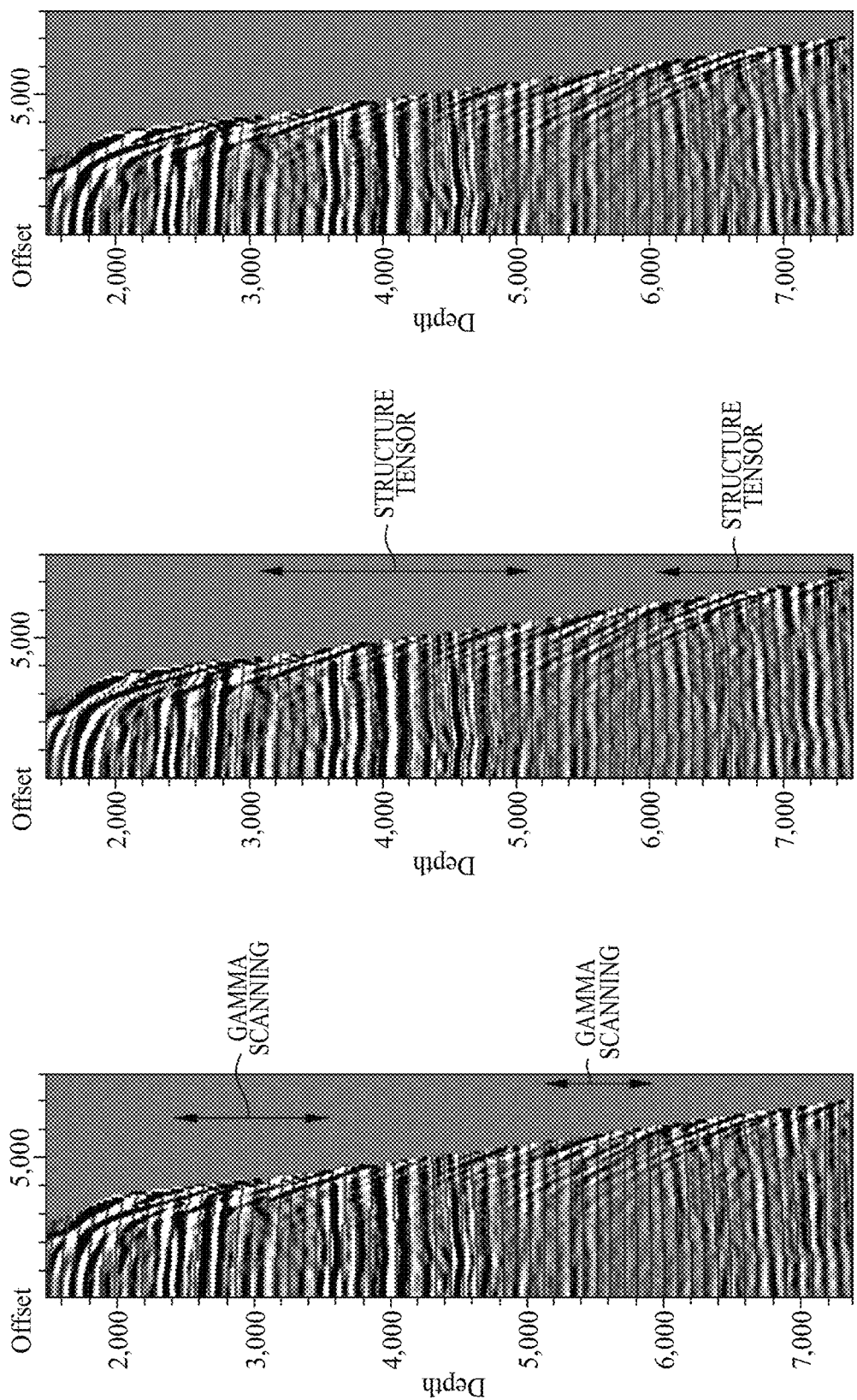

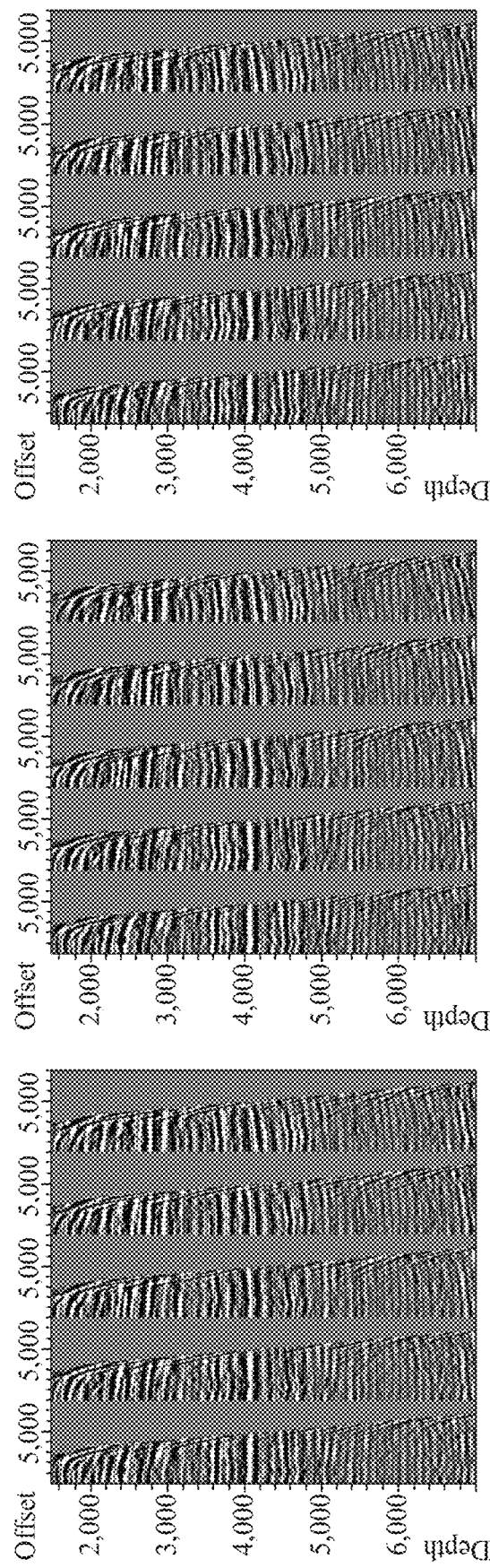

HYBRID RESIDUAL MOVEOUT ERROR ESTIMATION

CROSS-REFERENCE TO RELATED APPLICATION

This application claims the benefit of U.S. Provisional Patent Application No. 62/809,129 filed Feb. 22, 2019 entitled HYBRID RESIDUAL MOVEOUT ERROR ESTIMATION, the entirety of which is incorporated by reference herein.

FIELD

This disclosure relates generally to the field of geophysical prospecting and, more particularly, to prospecting for hydrocarbon and related data processing. Specifically, exemplary embodiments relate to methods and apparatus for improving computational efficiency and results accuracy by using a hybrid approach for residual moveout error estimation.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

An important goal of hydrocarbon prospecting is to accurately detect, locate, identify, model, and/or quantify subsurface structures and the likelihood of hydrocarbon occurrence therein. For example, seismic data may be gathered and processed to generate subsurface models. Seismic prospecting is facilitated by acquiring raw seismic data during performance of a seismic survey. During a seismic survey, one or more seismic sources generate seismic energy (e.g., a controlled explosion, or "shot") which is delivered/propagated into the earth. Seismic waves are reflected from subsurface structures and are received by a number of seismic sensors or "receivers" (e.g., geophones). The seismic data received by the seismic sensors is processed in an effort to create an accurate mapping (e.g., an image) of the subsurface region. For example, data recorded at receivers at different locations may be grouped (e.g., stacked) to add acoustic reflections derived from a same point in the subsurface to increase the signal-to-noise ratio (S/N). However, the arrival time of the waves at the receivers may vary as a function of the offset. Therefore, before traces are stacked, a Normal MoveOut (NMO) error correction may bring them to a common, zero-offset trace. Frequently, NMO error correction is not sufficiently precise, and an additional Residual MoveOut (RMO) error correction may be applied. For example, an RMO error correction may take the form of a quadratic function (e.g., parabolic) of offset. The processed data is then examined (e.g., analysis of images from the mapping) with a goal of identifying geological structures that may contain hydrocarbons.

Seismic data analysis often includes seismic velocity model building followed by imaging to depict subsurface geological structures around target oil and gas reservoirs. In order to build an accurate velocity model for a geologically complex area, reflection tomography methods have been widely used in the industry. Accurate velocity models rely upon appropriately selected input data for reflection tomography. Such input data may include estimates of RMO error in Common Image Gathers (CIG) from a Pre-Stack Depth Migration (PSDM) algorithm. The amount of CIG data for typical seismic imaging is extremely large, making estimation of RMO error challenging. Moreover, the amount of data makes accurate manual selection of RMO error functions (known as "picking") impracticable, if not impossible.

A variety of independent methods have been developed to automatically estimate RMO error. Each of the independent methods may be more applicable to certain circumstances, while less applicable to other circumstances. The various methods do not share a unified approach in terms of reliability and resolution. Each method has its own strengths and weaknesses. For example, a gamma scanning-based method has been commonly used due to its robustness, even for noisy data. However, gamma scanning-based methods tend to provide relatively low resolution of RMO error, such as based on a hyperbolic function approximation. As another example, non-hyperbolic RMO error could be efficiently estimated by a method based on spatio-temporal constraint equations, such as plane-wave destructor or structural tensor-guided methods. Although spatio-temporal constraint methods may be able to track more complex behavior of RMO error, they often run afoul due to noise, especially when noise is coherent and/or as strong as targeted events. For coherent noise situations, an approximate hyperbolic estimation based on gamma scanning-based method could provide a more robust result with constraints of a proper gamma range. However, there is no existing workflow capable of automatically switching among the various RMO error-picking algorithms.

More efficient equipment and techniques to estimate RMO error would be beneficial.

BRIEF DESCRIPTION OF THE DRAWINGS

So that the manner in which the recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, for the disclosure may admit to other equally effective embodiments and applications.

FIGS. 3A, 3B, and 3C illustrate an example application of a hybrid RMO error-estimation workflow.

FIGS. 7A, 7B, and 7C illustrate another example application of a hybrid RMO error-estimation workflow.

DETAILED DESCRIPTION

Figure 1:
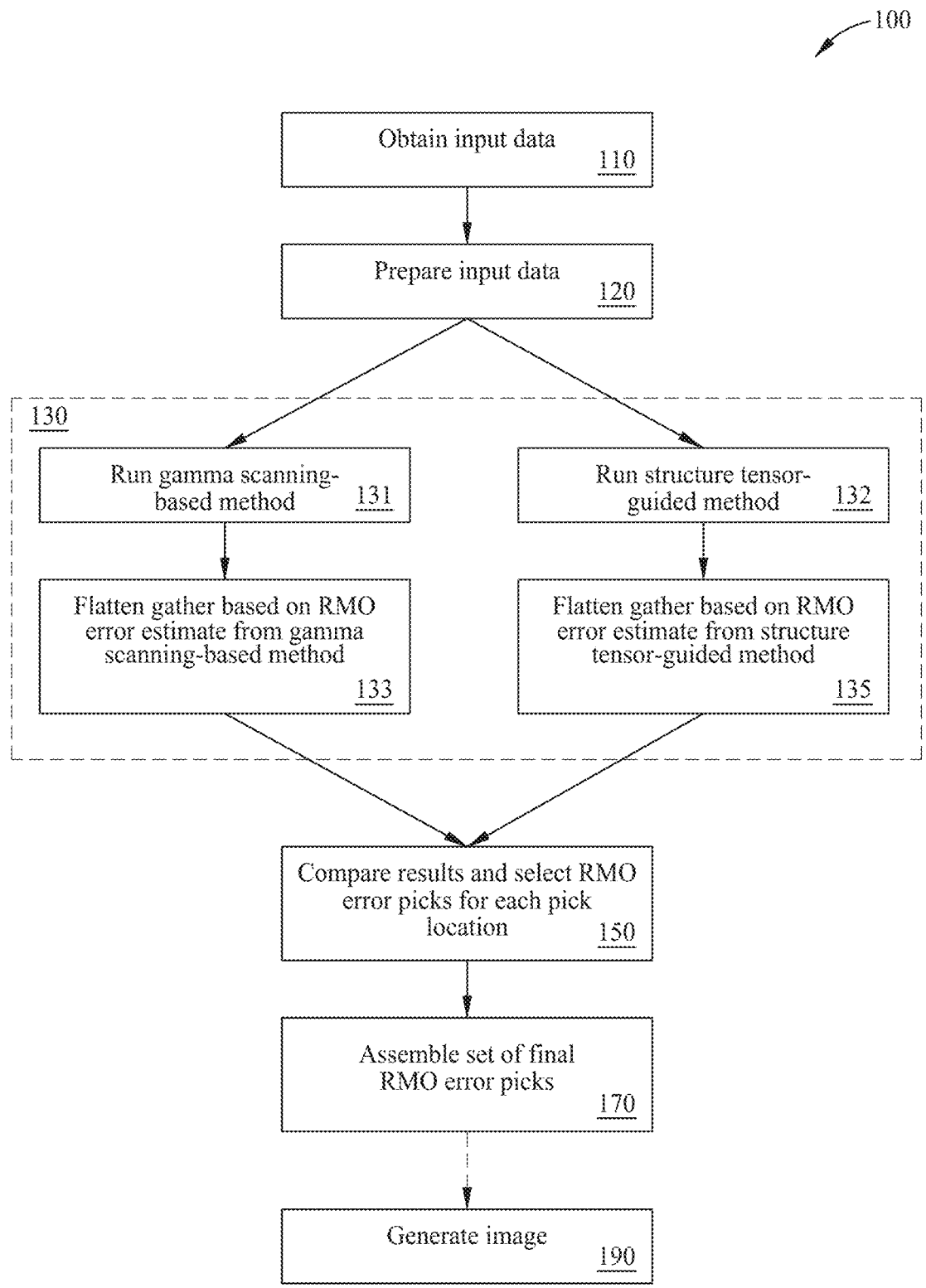
FIG. 1 illustrates a hybrid RMO error-estimation workflow.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects.

As used herein, "offset" refers to a distance between a source and a receiver. "Midpoint" refers to a location on the axis between a source and a receiver that is approximately half-way between the source and the receiver.

The term "simultaneous" does not necessarily mean that two or more events occur at precisely the same time or over exactly the same time period. Rather, as used herein, "simultaneous" means that the two or more events occur near in time or during overlapping time periods. For example, the two or more events may be separated by a short time interval that is small compared to the duration of the overall operation. As another example, the two or more events may occur during time periods that overlap by about 40% to about 100% of either period.

The term "seismic data" as used herein broadly means any data received and/or recorded as part of the seismic surveying process, including particle displacement, velocity, and/or acceleration, pressure, reflection, shear, and/or refraction wave data. "Seismic data" is also intended to include any data or properties, including geophysical properties such as one or more of: elastic properties (e.g., P and/or S wave velocity, P-Impedance, S-Impedance, density, attenuation, anisotropy, and the like); seismic stacks (e.g., seismic angle stacks); compressional velocity models; and porosity, permeability, or the like, that the ordinarily skilled artisan at the time of this disclosure will recognize may be inferred or otherwise derived from such data received and/or recorded as part of the seismic surveying process. Thus, this disclosure may at times refer to "seismic data and/or data derived therefrom," or equivalently simply to "seismic data." Both terms are intended to include both measured/recorded seismic data and such derived data, unless the context clearly indicates that only one or the other is intended.

The term "geophysical data" as used herein broadly includes seismic data, as well as other data obtained from non-seismic geophysical methods such as electrical resistivity.

The terms "velocity model," "density model," "physical property model," or other similar terms as used herein refer to a numerical representation of parameters for subsurface regions. Generally, the numerical representation includes an array of numbers, typically a 3-D array, where each number, which may be called a "model parameter," is a value of velocity, density, or another physical property in a cell, where a subsurface region has been conceptually divided into discrete cells for computational purposes. For example, the spatial distribution of velocity may be modeled using constant-velocity units (layers) through which ray paths obeying Snell's law can be traced. A geologic model may be represented in volume elements (voxels), in a similar way that a photograph is represented by picture elements (pixels).

As used herein, "hydrocarbon management" or "managing hydrocarbons" includes any one or more of the following: hydrocarbon extraction; hydrocarbon production, (e.g., drilling a well and prospecting for, and/or producing, hydrocarbons using the well; and/or, causing a well to be drilled to prospect for hydrocarbons); hydrocarbon exploration; identifying potential hydrocarbon-bearing formations; characterizing hydrocarbon-bearing formations; identifying well locations; determining well injection rates; determining well extraction rates; identifying reservoir connectivity; acquiring, disposing of, and/or abandoning hydrocarbon resources; reviewing prior hydrocarbon management decisions; and any other hydrocarbon-related acts or activities. The aforementioned broadly include not only the acts themselves (e.g., extraction, production, drilling a well, etc.), but also or instead the direction and/or causation of such acts (e.g., causing hydrocarbons to be extracted, causing hydrocarbons to be produced, causing a well to be drilled, causing the prospecting of hydrocarbons, etc.).

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

As used herein, a "gather" refers to a display of seismic traces that share an acquisition parameter. For example, a common midpoint gather contains traces having a common midpoint with different spacing between a source and a receiver (so called "offset"), while a common shot gather contains traces having a common shot.

As used herein, "picking" generally refers to the action of selecting an estimation (e.g., a function) of Residual MoveOut (RMO) error. In the simplest cases, picking may select between linear, parabolic, and hyperbolic RMO error estimations. For example, an event in a seismic image may be an amplitude change in a spatial dimension (e.g., x, y, offset, and depth). The event may be understood to represent, for example, a lithologic contrast of subsurface sedimentary rocks. The spatial location of the seismic event may be affected by the velocity correctness of overburden rocks above the event during seismic imaging. For example, if the seismic imaging velocity is correct, the seismic event in a Common Image Gather (CIG) will be generally flat and aligned along an offset axis at the same depth. Thus, the depth difference of the same event with a different offset, also called "RMO error," becomes zero. However, if seismic imaging velocity is too slow with respect to the actual velocity, the seismic events tend to be positioned shallower along increasing offset, and the RMO curves upward. In contrast, if the seismic imaging velocity is too fast, the events become deeper along increasing offset, and the RMO curves downward. Identifying a function that estimates the depth change of the same event along the offset axis is referred to as "picking." Various methods have been typically used to make picking decisions, ranging from a simple semblance scanning method, based on hyperbolic assumption of RMO trajectory, to a non-hyperbolic pick method, like a least squares inversion-based method (see e.g., U.S. Pat. No. 9,482,770).

As used herein, "semblance" refers to a measure of multichannel coherence, such as an expression of data coherency along offset.

If there is any conflict in the usages of a word or term in this specification and one or more patent or other documents that may be incorporated herein by reference, the definitions that are consistent with this specification should be adopted for the purposes of understanding this disclosure.

One of the many potential advantages of the embodiments of the present disclosure is that results of different RMO error-picking algorithms may be automatically considered, selected, assembled, and/or merged. Another potential advantage includes providing a ranking of the results from the different picking algorithms based on expected picking performance and/or data characteristics. Another potential advantage includes utilizing the results from different picking algorithms to ensure superior and/or optimal picking results in terms of reliability and resolution. Generally, compared to any existing single engine-based approach, the disclosed hybrid RMO error estimation methods and systems may provide tomographic inversion with better input data because 1) the picks are in high resolution as long as data quality is reliable enough to pick non-hyperbolic moveout, and 2) the picks are more reliable with hyperbolic moveout approximation for noisy area, where data quality is so poor to pick non-hyperbolic moveout. Thus, another potential advantage includes high resolution and reliable input for tomographic inversion, thereby promoting convergence to a solution (velocity model) with a higher resolution as well as better stability. Embodiments of the present disclosure can thereby be useful in the discovery and/or extraction of hydrocarbons from subsurface formations.

Some embodiments disclosed herein provide hybrid RMO error estimation workflows. For example, a hybrid RMO error estimation workflow may automatically switch between different RMO error-picking algorithms, depending upon expected picking performance and/or data characteristics. Various RMO error-picking algorithms may include: gamma scanning-based methods, semblance-based methods, cross-correlation-based methods, structure tensor-guided methods, dynamic warping-based methods, global inversion-based methods, plane wave destructor-based methods, probability neural network-based methods, AB semblance-based methods, and eigenvalue-based coherence methods. Within a hybrid RMO error estimation workflow, multiple of these picking algorithms may be run simultaneously. Within the workflow, seismic attributes may be measured and/or analyzed to determine which picking algorithm is likely to produce preferred results at each pick location. Preferred picks at each pick location—likely from different picking algorithms—may be assembled into a set of final RMO error picks for hybrid RMO error estimation.

In some embodiments, picks may be selected from two (or more) picking algorithms. For example, picks may be selected from two contrasting picking algorithms, such as gamma scanning-based methods and structure tensor-guided methods. In some embodiments, each selection may be based on a comparison of a seismic attribute of a flattened gather. For example, an input gather may be first flattened by the amount of RMO error estimated, computed by the respective picking algorithm. Then semblance may be measured for each flattened gather to assess how well each seismic event is aligned by flattening. It should be understood that, as the RMO error estimate measurement approaches the actual RMO error of the seismic events, semblance from flattened gather generally increases. In some embodiments, the semblance may be utilized to determine the preferred picking algorithm at each pick location.

In some embodiments, selecting picks from two (or more) picking algorithms may be automated. In some embodiments, a machine learning (ML) system may be trained and/or utilized to automatically select better picks from multiple picking methods. For example, a pick selection process may include analyzing various seismic attributes. In some embodiments, the pick selection process includes analyzing seismic semblance, which typically increases as RMO in gathers are corrected (flattened) based on better RMO error measurement. If semblance from one RMO error picking method is higher than the other method(s), the method with higher semblance is likely to have a better picking result. In some embodiments, the pick selection process includes analyzing linearity (also known as "coherency"), which may be measured as a byproduct from a structure tensor-based non-hyperbolic picking method. Linearity usually decreases as more seismic events are conflicting with each other, implying picks from the high-resolution, non-hyperbolic picking method would be less reliable.

In some embodiments, more than one attribute may be utilized to determine a preferred RMO error-picking algorithm. For example, when data has lower signal-to-noise ratio (S/N), structure tensor-guided methods often pick events with inferior performance and/or data characteristics. The structure tensor-guided methods may be influenced by coherent and/or stronger noise (e.g., multiples and refracted signal), resulting in incorrect estimates of RMO error with higher semblance value (since well-aligned coherent noise also increases semblance). Thus, in some embodiments, in conjunction with semblance, another attribute (e.g., linearity) may be calculated to differentiate between coherence and interference in a single event. Utilizing such additional information may improve the picking algorithm selection process for noisy data.

In some embodiments, the selection process may be automated. For example, selecting from two (or more) picking algorithms may be done in a more data-dependent manner In some embodiments, a ML system may be utilized for RMO error picking. For example, a ML system may learn RMO error picking from training data. The ML system may then be utilized for RMO error picking without the benefit of explicit programming for RMO error picking. A ML system may learn patterns or features from a relatively small training data set. In some embodiments, a user may assign values to attributes of the training data set and/or the validation data set in a supervised ML approach. The trained ML system may then predict a certain outcome for future instances by examining various characteristic patterns of the instances. A ML system may correlate user feedback about preferred picking results for a training subset of data with attributes extracted from the training subset. The trained ML system may rank the RMO error-picking algorithms based on picking performance and/or data characteristics based on analysis of data attributes. In some embodiments, such data attributes may be automatically extracted from a full production data set. In some embodiments, the trained ML system may be validated against a validation data set. In some embodiments, the trained and validated ML system may be utilized to perform hybrid RMO error picking for a production data set.

FIG. 1 illustrates a hybrid RMO error estimation workflow 100. Workflow 100 utilizes multiple RMO error-picking algorithms for RMO error estimation. Workflow 100 begins at block 110 where input data is obtained. For example, the input data may include Common Image Gather (CIG) data from a Pre-Stack Depth Migration (PSDM) algorithm. In some embodiments, the input data may be migrated seismic data represented in a depth domain. In some embodiments, a seismic survey may be conducted to acquire the input data (noting that these and other embodiments may also or instead include obtaining other geophysical data in addition or, or instead of, seismic data—such as obtaining electrical resistivity measurements). In these and other embodiments, models may be utilized to generate synthetic input data (e.g., computer simulation). In some embodiments, the input data may be obtained from a library of data from previous seismic surveys or previous computer simulations. In some embodiments, a combination of any two or more of these methods may be utilized to generate the input data. Generally, the input data will be specific to a subsurface region that may contain a hydrocarbon-bearing formation.

Workflow 100 continues at block 120 where the input data is prepared. For example, the input data may be cleaned before picking. In some embodiments, preparing the input data includes filtering (e.g., use a filter to remove high frequency noise). In some embodiments, preparing the input data includes scaling (e.g., muting, such as for far-offset data). In some embodiments, data preparation may be minimal and/or nonexistent, and workflow 100 may substantially bypass block 120.

Workflow 100 continues at block 130 where multiple RMO error-picking algorithms are analyzed in light of the prepared input data. In the illustrated example, analyzing multiple RMO error-picking algorithms at block 130 includes running a gamma scanning-based method at block 131 and running a structure tensor-guided method at block 132, each with the prepared data as input. The multiple RMO error-picking algorithms may be run in any order and/or simultaneously. Also included in analyzing multiple RMO error-picking algorithms at block 130, gathers are flattened based on the multiple RMO error estimates (e.g., RMO error estimates from the gamma scanning-based method (at block 133) and from the structure tensor-guided method (at block 135)). The gather flattening for the various RMO error estimates may proceed in any order, and/or simultaneously, though always subsequent to running the respective RMO error-picking algorithm. The gather flattening may allow for better comparison amongst the results of the multiple RMO error estimates.

Workflow 100 continues at block 150 where the results of the multiple RMO error-picking algorithms are compared. For example, the results may be compared based on analysis of seismic attributes. In some embodiments, the seismic attributes may include linearity, seismic semblance, and/or S/N. Based on the comparison, picks for each pick location may be selected (e.g., by a user). It should be appreciated that the number of pick locations may typically be between about 10,000 and about 1,000,000. In some embodiments, pick locations may be grouped (e.g., by geographic zones), and a representative comparison may be made at one or a subset of the pick locations within the group, thereby determining the preferred RMO error-estimation algorithm for the entire group.

Workflow 100 continues at block 170 where the picks for each pick location are assembled into a set of final RMO error picks. For example, for each pick location, a pick from a single one of the multiple RMO error-picking algorithms may be assigned in a pick-or-drop assembly scheme. As another example, for each pick location, a weighted average of picks from one or more of the multiple RMO error picking-algorithms may be assigned in a blended assembly scheme.

In some embodiments, workflow 100 continues at block 190 where the set of final RMO error picks may be used to generate an image of the subsurface. For example, a tomography algorithm (e.g., tomographic inversion) may be run at block 190 to generate and/or update a velocity model of the subsurface. In some embodiments, the set of final RMO error picks may be used as input for the tomography algorithm, which may improve imaging the subsurface.

Figure 2A:
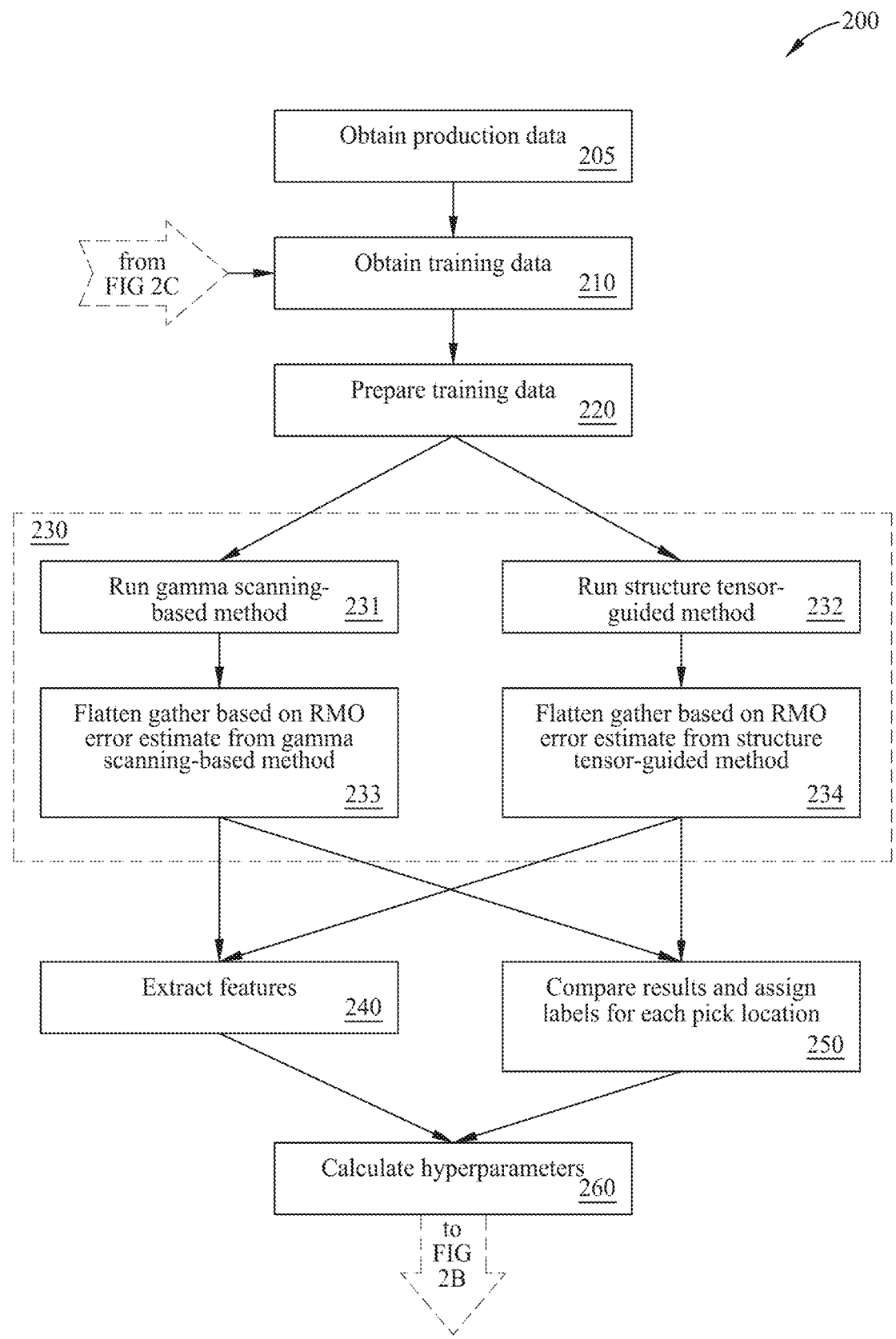
FIGS. 2A, 2B, and 2C illustrate another hybrid RMO error-estimation workflow.
Figure 2B:
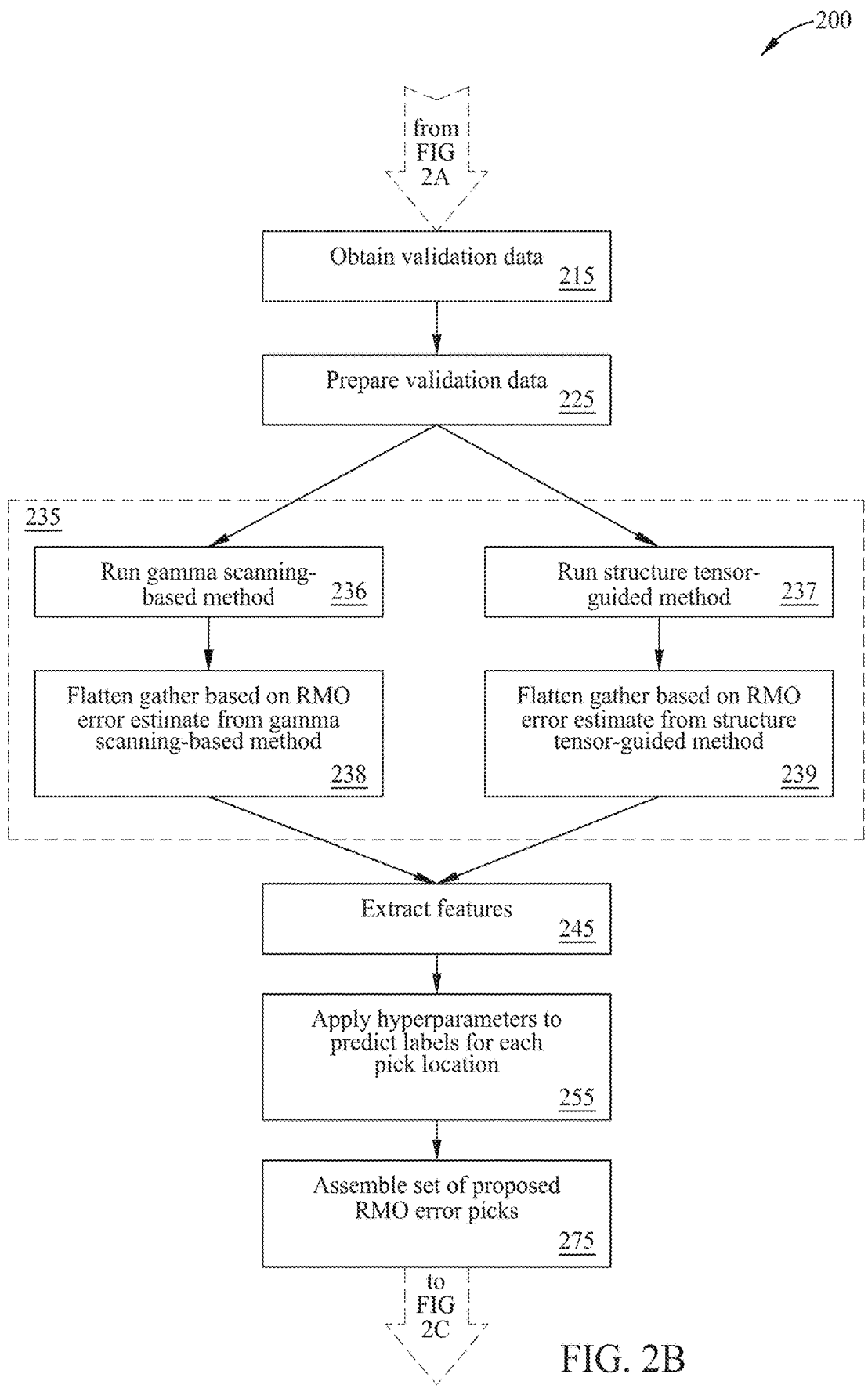
Figure 2C:
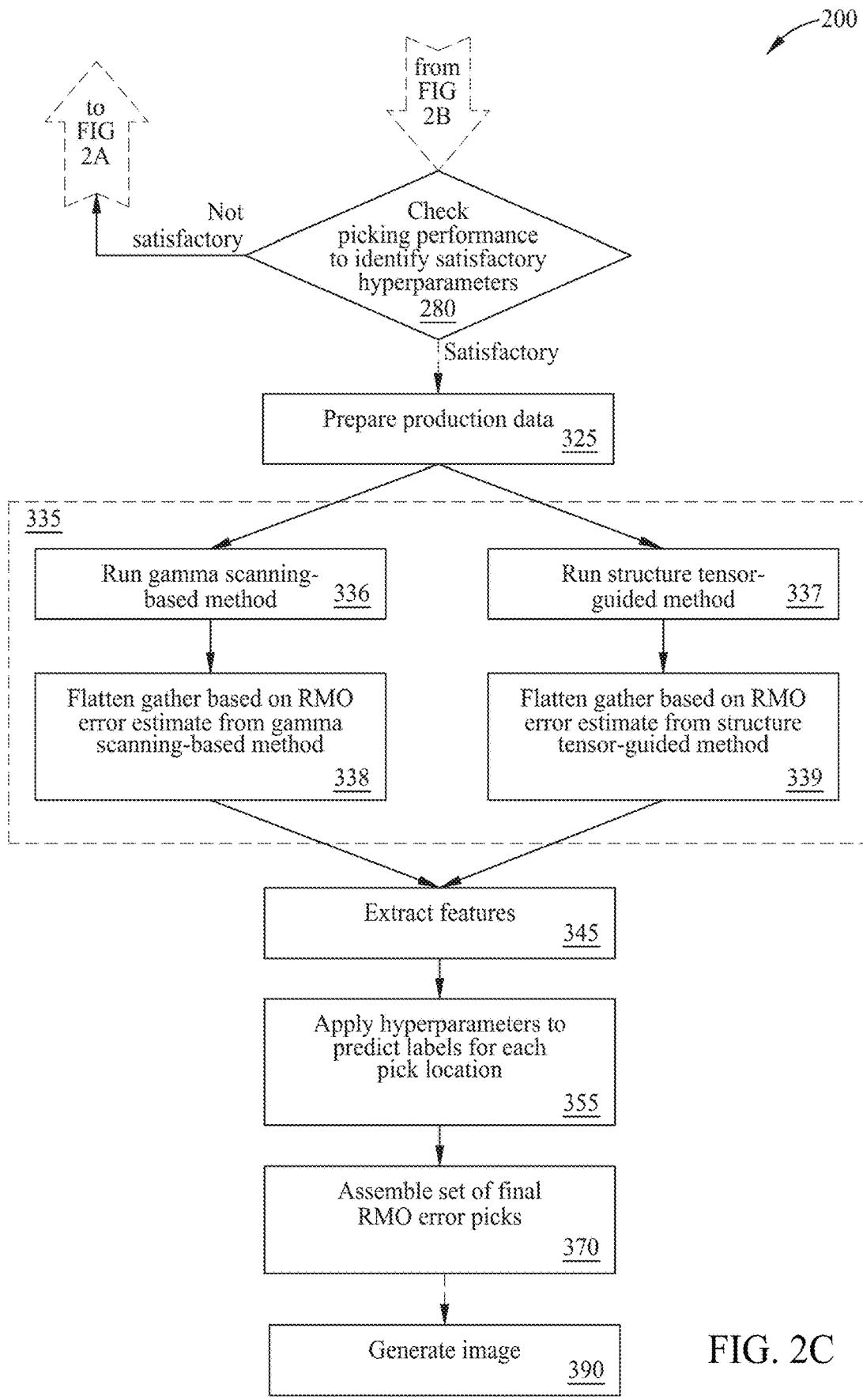

FIGS. 2A, 2B, and 2C illustrate another hybrid RMO error-estimation workflow 200. Workflow 200 utilizes multiple RMO error-picking algorithms within a ML system for RMO error estimation. As illustrated, workflow 200 contains three stages: training the machine learning system (FIG. 2A), validating the training of the machine learning system (FIG. 2B), and applying the machine learning system to a set of production data (FIG. 2C). It should be understood that a trained machine learning system may be applied to production data in the absence of validation. Moreover, it should be understood that a machine learning system may be trained, or trained and validated, without being applied to production data. Workflow 200 begins at block 205 where a set of production data is obtained. As with the input data of workflow 100, the production data may be obtained from a seismic survey, a computer simulation, a data library, or a combination of any two or more of these. Generally, the production data will be specific to a subsurface region that may contain a hydrocarbon-bearing formation.

Workflow 200 continues at block 210 where training data is obtained. As with the input data of workflow 100, the training data may be obtained from a seismic survey, a computer simulation, a data library, or a combination of any two or more of these. In some embodiments, the training data may be a subset of the production data (from block 205). In some embodiments, the training data may be a randomized selection from the production data in order to avoid sampling bias in a statistical point of view.

As with workflow 100, workflow 200 continues at block 220 where the training data is prepared. In some embodiments, data preparation may be minimal and/or nonexistent, and workflow 200 may substantially bypass block 220.

As with workflow 100, workflow 200 continues at block 230 where multiple RMO error picking algorithms are analyzed in light of the prepared training data. In the illustrated example, analyzing multiple RMO error-picking algorithms at block 230 includes running a gamma scanning-based method at block 231 and running a structure tensor-guided method at block 232, each with the prepared training data as input. The multiple RMO error-picking algorithms may be run in any order and/or simultaneously. Also included in analyzing multiple RMO error-picking algorithms at block 230, gathers are flattened based on the multiple RMO error estimates (e.g., RMO error estimates from the gamma scanning-based method (at block 233) and from the structure tensor-guided method (at block 234)). The gather flattening for the various RMO error estimates may proceed in any order, and/or simultaneously, though always subsequent to running the respective RMO error-picking algorithm.

Workflow 200 continues at blocks 240 and 250, which may be performed in either order or simultaneously. At block 240, features are extracted by computing various characteristics of data from the flattened gathers using each of the RMO error-picking algorithms. For example, the computed characteristics of data (i.e., features) may include weighted semblance difference attributes, average linearity attributes, S/N attributes, depth attributes, dominant frequency attributes, etc.

At block 250, the results of the multiple RMO error-picking algorithms are compared at each pick location. In some embodiments, labels may be assigned (e.g., by a user) to each pick location. In some embodiments, geographic zones may be designated in the subsurface, and labels may be assigned to each zone, and thereby to each pick location within each zone. For example, a label of 0 may be assigned to a zone where the gamma scanning-based method performs better (e.g., as assessed by the user-assignor), and a label of 1 may be assigned to a zone where the structure tensor-guided method does better. It is currently believed that geographically nearby locations may tend to have similar RMO error, resulting in similar picks for locations in a zone.

Workflow 200 continues at block 260 where hyperparameters are calculated for logistic regression based on the extracted features (from block 240) and assigned labels (from block 250). For example, for a simple linear regression, the hyperparameters may be a slope and intercept of a straight regression line. In some embodiments, a quality assurance check (not shown) follows block 260 to confirm that the hyperparameters are satisfactory for the training data.

Workflow 200 continues at block 215 (in FIG. 2B) where validation data is obtained. As with the input data of workflow 100, the validation data may be obtained from a seismic survey, a computer simulation, a data library, or a combination of any two or more of these. In some embodiments, the validation data may be a subset of the production data (from block 205). Note that the validation data may be obtained before, after, or simultaneously with obtaining the training data (at block 210). Also, note that the training data and the validation data should be substantially independent data sets. For example, no more than 50% of the validation data should be common to the training data.

As with workflow 100, workflow 200 continues at block 225 where the validation data is prepared. The validation data may be prepared before, after, or simultaneously with preparing the training data (at block 220). In some embodiments, data preparation may be minimal and/or nonexistent, and workflow 200 may substantially bypass block 225.

As with workflow 100, workflow 200 continues at block 235 where multiple RMO error-picking algorithms are analyzed in light of the prepared validation data. The multiple RMO error-picking algorithms may be analyzed in light of the validation data (at block 235) before, after, or simultaneously with analyzing the multiple RMO error-picking algorithms in light of the training data (at block 230). However, it is currently believed that the efficiency of method 200 may improve when the multiple RMO error-picking algorithms are first analyzed in light of the training data (at block 230), and then the multiple RMO error-picking algorithms may be analyzed in light of a validation data set (at block 235). Moreover, the efficiency of method 200 may improve when the validation data set is fully independent of the training data set. In the illustrated example, analyzing multiple RMO error-picking algorithms at block 235 includes running a gamma scanning-based method at block 236 and running a structure tensor-guided method at block 237, each with the prepared validation data as input. The multiple RMO error-picking algorithms may be run in any order and/or simultaneously. Also included in analyzing multiple RMO error-picking algorithms at block 235, gathers are flattened based on the multiple RMO error estimates (e.g., RMO error estimates from the gamma scanning-based method (at block 238) and from the structure tensor-guided method (at block 239)). The gather flattening for the various RMO error estimates may proceed in any order, and/or simultaneously, though always subsequent to running the respective RMO error-picking algorithm.

Workflow 200 continues at block 245, similar to block 240, where features are extracted from the flattened gathers from each of the RMO error-picking algorithms.

Workflow 200 continues at block 255 where the calculated hyperparameters (from block 260) are applied to predict labels for each zone. For example, logistic regression may be applied with the hyperparameters and the extracted features (from block 245) into the validation data set (from block 215) to predict labels for each zone. For example, a label of 0 may be assigned to a zone where the gamma scanning-based method is predicted to perform better, and a label of 1 may be assigned to a zone where the structure tensor-guided method is predicted to do better.

Workflow 200 continues at block 275, similar to block 170, where the predicted picks for each pick location are assembled into a set of proposed RMO error picks. For example, the set of proposed RMO error picks may be a hybrid set of RMO picks from the various RMO error-picking algorithms based on the predicted labels.

Workflow 200 continues at block 280 (in FIG. 2C) where the picking performance of the set of proposed RMO error picks is checked against the validation data set. For example, the predicted labels from block 255 may be compared with the assigned labels of block 250 to assess how accurately the trained ML system predicts the assigned labels. If the picking performance is deemed not satisfactory, steps of the workflow 200 may be repeated with adjusted parameters until the picking performance is satisfactory. For example, additional training data may be obtained at block 210. As before, the training data and the validation data should remain substantially independent data sets. As workflow 200 progresses, the additional training data may result in adjusted hyperparameters at block 260. The adjusted hyperparameters may then result in adjusted label predictions at block 255, and thus adjusted proposed RMO error picks at block 275. Note that actions from blocks 215-245 (related to the validation data) are not repeated with each iteration. Workflow 200 may continue checking the picking performance of the set of proposed RMO error picks and repeating with adjusted parameters (e.g., by adding more training data or using/extracting other features) until the picking performance is satisfactory. Thus, the adjusted hyperparameters that result in the satisfactory set of proposed RMO error picks may be identified as the satisfactory hyperparameters.

Once the picking performance is deemed satisfactory, workflow 200 may continue at block 325 where the production data (from block 205) is prepared. The production data may be prepared before, after, or simultaneously with preparing the training data (at block 220) and/or the validation data (at block 225). In some embodiments, data preparation may be minimal and/or nonexistent, and workflow 200 may substantially bypass block 325.

It should be appreciated that, in some embodiments, workflow 200 may stop temporarily or indefinitely once satisfactory picking performance has been identified at block 280. For example, in some embodiments, workflow 200 may be utilized to train and validate a ML system, thereby stopping after satisfactory picking performance at block 280, never reaching block 325.

Workflow 200 continues at block 335 where multiple RMO error-picking algorithms run in light of the prepared production data (from block 325) and the satisfactory set of proposed RMO error picks (from block 280). In the illustrated example, running multiple RMO error-picking algorithms at block 335 includes running a gamma scanning-based method at block 336 and running a structure tensor-guided method at block 337, each with the prepared production data as input. The multiple RMO error-picking algorithms may be run in any order and/or simultaneously. Also included in analyzing multiple RMO error-picking algorithms at block 335, gathers are flattened based on the multiple RMO error estimates (e.g., RMO error estimates from the gamma scanning-based method (at block 338) and from the structure tensor-guided method (at block 339)). The gather flattening for the various RMO error estimates may proceed in any order, and/or simultaneously, though always subsequent to running the respective RMO error-picking algorithm.

Workflow 200 continues at block 345, similar to block 245, where features are extracted from the flattened gathers from each of the RMO error-picking algorithms.

Workflow 200 continues at block 355 where labels are assigned to each zone. For example, logistic regression may be applied with the satisfactory hyperparameters (from block 280), the extracted features (from block 345), and the production data set (from block 205) to assign labels for each zone (similar to predictions made for the validation data at block 255).

Workflow 200 continues at block 370 where the picks for each pick location are assembled into a set of final RMO error picks.

In some embodiments, as with workflow 100, workflow 200 may continue at block 390 where the set of final RMO error picks may be used to generate an image of the subsurface. The image may be examined (e.g., analysis of images from the mapping) with a goal of identifying geological structures that may contain hydrocarbons.

An example application of a hybrid RMO error estimation workflow is illustrated in FIGS. 3A, 3B, and 3C. This example is akin to workflow 100 of FIG. 1. Sample CIG gathers (migrated from BP AIT synthetic data) are shown in grayscale in the background in FIGS. 3A, 3B, and 3C, while picking results are overlaid. (Note that the BP AIT synthetic data was provided courtesy of BP America and Frederic Billette.) In this example, the CIG gathers are migrated with a Kirchhoff PSDM algorithm with synthetic data and an initial background velocity model. The initial velocity model excludes shallow velocity anomalies, which tend to cause significant RMO error and noise. It should be understood that more noisy data will appear in CIG gathers as having more slanted lines, while less noisy data will appear as having more flat lines. Typically, a single RMO error estimation method will not be capable of measuring RMO error with good accuracy and reliability. For example, as shown in FIG. 3A, the gamma scanning-based method can make relatively reliable picks even at noisy areas, but provides only an approximate hyperbolic solution. In contrast, as shown in FIG. 3B, the structure tensor-guided method provides high resolution RMO picks at relatively good S/N areas, but loses accuracy at noisy areas. When the workflow is run, as shown in FIG. 3C, hybrid picks are selectively chosen based on a simple semblance comparison of gathers flattened by the two contrasting methods. Picks from gamma scanning-based method are selected where data is noisy and contaminated by other conflicting noise (i.e., depths between 1,500 m and 3,000 m, and depths between 5,000 m and 6,000 m). The structure tensor-guided picks are chosen where S/N is better (i.e., depths between 3,000 m and 5,000 m), thus providing non-hyperbolic moveout details in measurements.

Figures 4A, 4B:
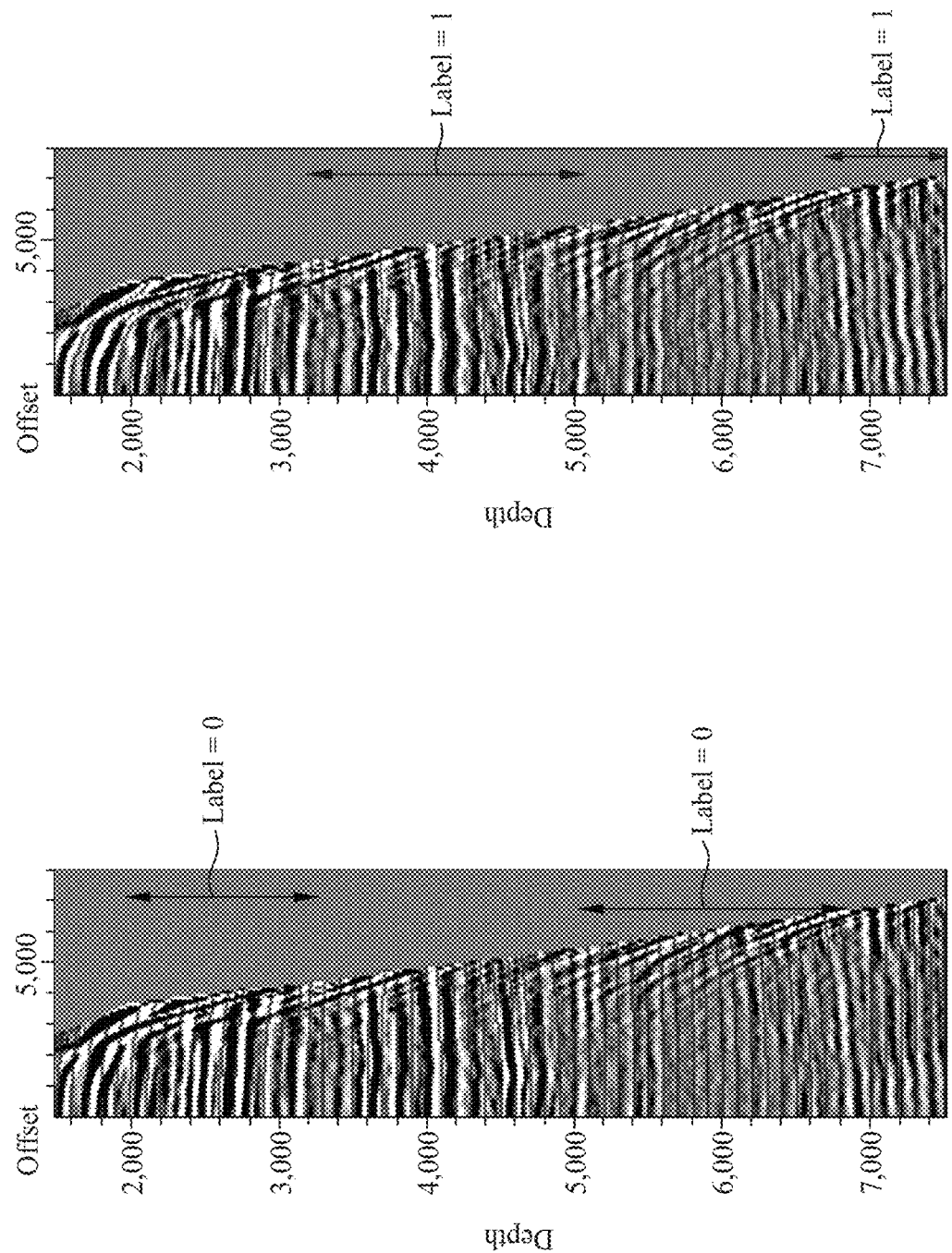
FIGS. 4A, 4B, and 4C illustrate another example application of a hybrid RMO error-estimation workflow.
Figure 4C:
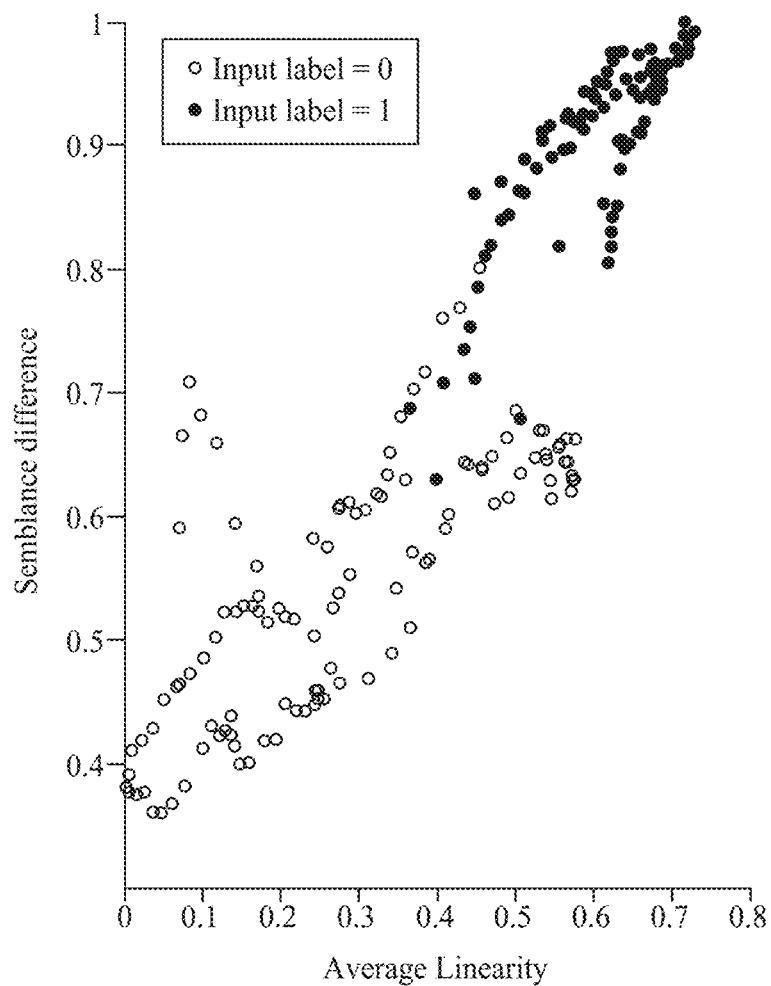

Another example application of a hybrid RMO error estimation workflow is illustrated in FIGS. 4A, 4B, and 4C. This example is akin to the ML system training portion of workflow 200 of FIG. 2A. This example uses the same CIG gathers from BP AIT synthetic data and initial background velocity model as in FIGS. 3A, 3B, and 3C. As before, the sample CIG gathers are shown in grayscale in the background in FIGS. 4A and 4B, while picking results are overlaid. FIG. 4A illustrates picks from a gamma scanning-based method. FIG. 4B illustrates picks from structure tensor-guided method. In FIGS. 4A and 4B, a user has compared picking performance of the two distinct RMO error estimation methods and labeled them accordingly. For example, where the user deemed the picks from gamma scanning-based method better than structure tensor-guided method, the picks are labeled with 0, while picks deemed better from the structure tensor-guided method are labeled with 1. FIG. 4C illustrates a scatter plot of the labels according to semblance difference and average linearity features extracted from the training data.

Figure 5B:
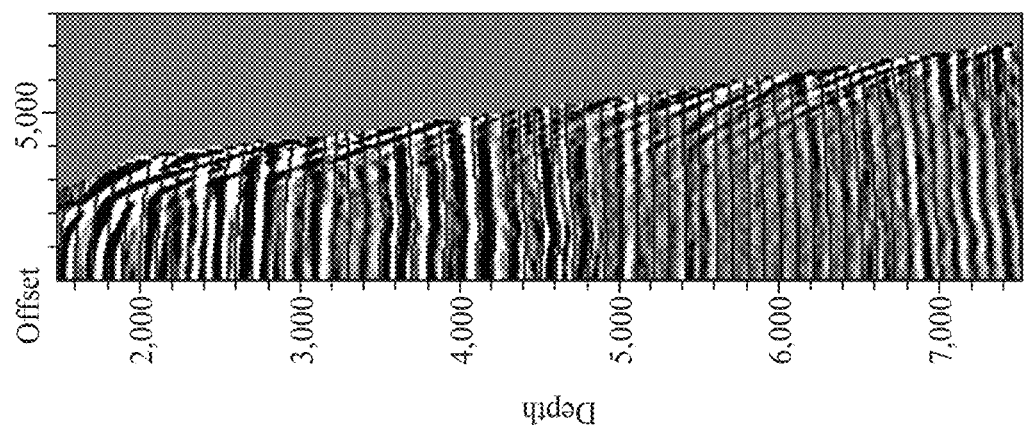
FIGS. 5A and 5B illustrate another example application of a hybrid RMO error-estimation workflow.
Figure 5A:
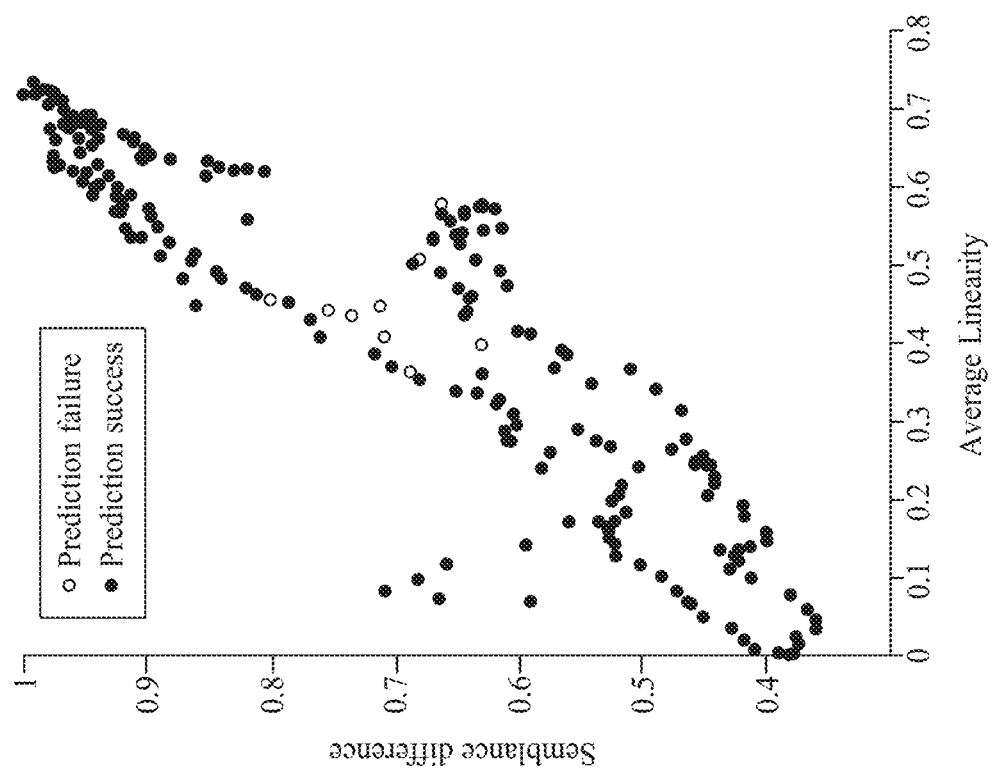

Another example application of a hybrid RMO error estimation workflow is illustrated in FIGS. 5A and 5B. This example is akin to the ML system validation portion of workflow 200 of FIG. 2B. In this example, a ML system executes the RMO error-picking workflow. In order to train the ML system, the workflow may extract characteristic features of data at picking locations. In the above examples, two characteristic features have been selected: weighted semblance difference and average linearity. The scatter plot of FIG. 4C shows that picks with higher values of both features tend to have user-assigned label=1 (i.e., when both features are relatively high, the structure tensor-guided method outperforms the gamma scanning-based method). Likewise, picks with lower values of both features tend to have user-assigned label=0 (i.e., when both features are relatively low, the gamma scanning-based method outperforms the structure tensor-guided method). Based on the user's feedback and calculated features, a logistic regression algorithm may be used to compute hyperparameters. Using the hyperparameters and the calculated features, the ML system may predict labels. As illustrated in FIG. 5A, the ML system may predict labels with an accuracy of about 95%. FIG. 5B illustrates the resulting hybrid picks.

Figure 6A:
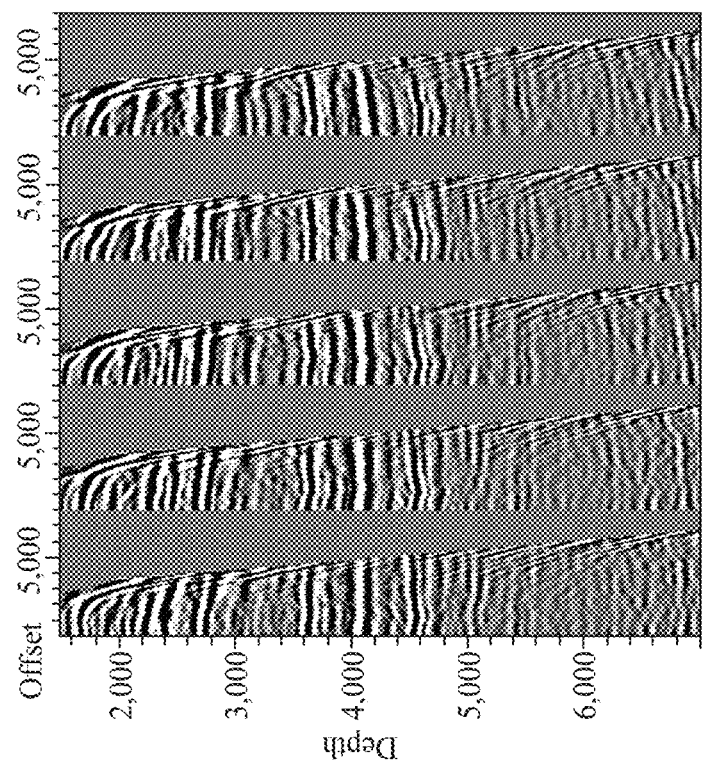
FIGS. 6A and 6B illustrate another example application of a hybrid RMO error-estimation workflow.
Figure 6B:
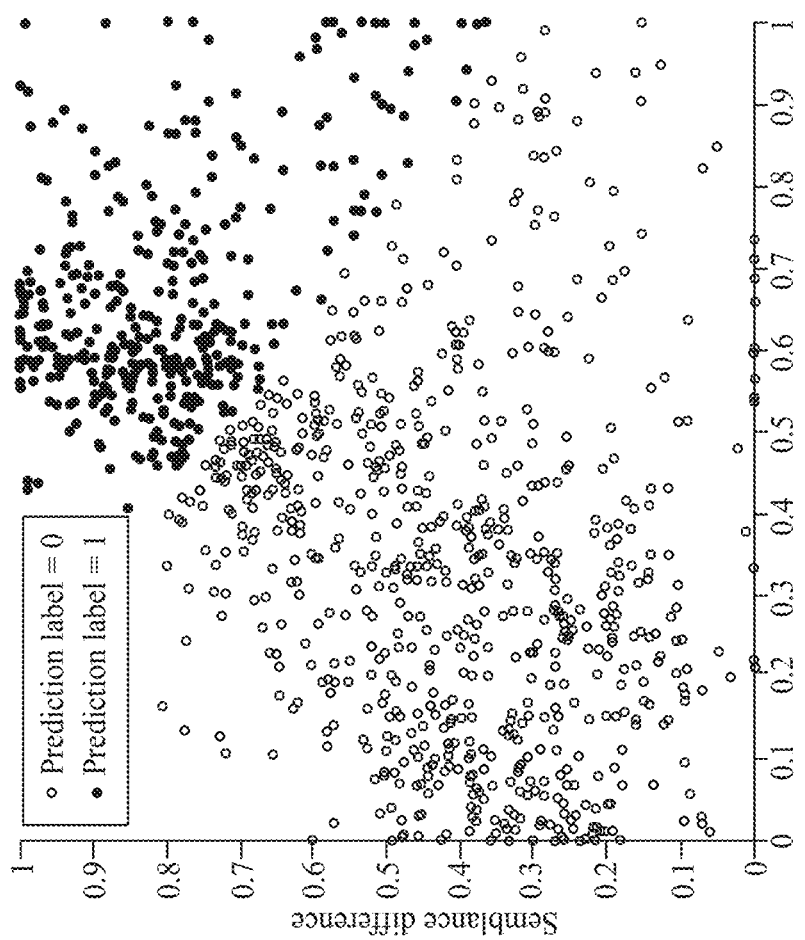

Another example application of a hybrid RMO error estimation workflow is illustrated in FIGS. 6A and 6B. This example is akin to the ML system validation portion of workflow 200 of FIG. 2B. A quality assurance check may confirm that the prediction accuracy is sufficiently satisfactory for a training data set. Then, a logistic regression classifier with computed hyperparameters may be iteratively applied to a validation data set until a hybrid picking result is deemed satisfactory for the validation data set. FIG. 6A illustrates CIG gathers in a production data set. FIG. 6B illustrates a scatter plot of predicted labels for the production data set, estimated by a logistic regression classifier based on the features (i.e., semblance difference and average linearity) and the satisfactory hyperparameters (from the training). The logistic regression classifier with the satisfactory hyperparameters may be applied to a production data set (FIG. 6A) to predict a probability that a new pick can be better estimated by structure tensor-guided method than gamma scanning-based method. If the probability is larger than 0.5, a predicted label becomes 1, meaning that a pick can be better measured by structure tensor-guided method, and vice versa, as illustrated in FIG. 6B.

Another example application of a hybrid RMO error estimation workflow is illustrated in FIGS. 7A, 7B, 7C. This example is akin to the portion of workflow 200 where the trained ML system is applied to the production data set (FIG. 2C). FIG. 7A illustrates picking results from a gamma scanning-based method for a production data set. FIG. 7B illustrates picking results from a structure tensor-guided method for the production data set. FIG. 7C illustrates picking results from running workflow 200 with the production data set on a ML system. As illustrated in FIG. 7A, picks from the gamma scanning-based method are satisfactory even with strong noise, for example, steeply dipping linear noise at far offset depths of between 2 and 3 km, and depths of between 5 and 6 km. As illustrated in FIG. 7B, picks from the structure tensor-guided method deviate from the sample RMO error measurement. The ML-based hybrid picks of FIG. 7C provide a solution that balances accuracy and reliability based on characteristic data quality (i.e., linearity) and comparative picking performance from each method (i.e., semblance difference). The hybrid picks at the noisy area (depths between 2 and 3 km, and depths between 5 and 6 km) are from gamma scanning-based method. The hybrid picks at good S/N area (depths between 3.5 and 5 km) are from structure tensor-guided method.

In practical applications, the present technological advancement may be used in conjunction with a seismic data analysis system (e.g., a high-speed computer) programmed in accordance with the disclosures herein. Preferably, the seismic data analysis system is a high performance computer (HPC), as known to those skilled in the art. Such high performance computers typically involve clusters of nodes, each node having multiple CPUs and computer memory that allow parallel computation. The models may be visualized and edited using any interactive visualization programs and associated hardware, such as monitors and projectors. The architecture of the system may vary and may be composed of any number of suitable hardware structures capable of executing logical operations and displaying the output according to the present technological advancement. Those of ordinary skill in the art are aware of suitable supercomputers available from Cray or IBM.

Figure 8:
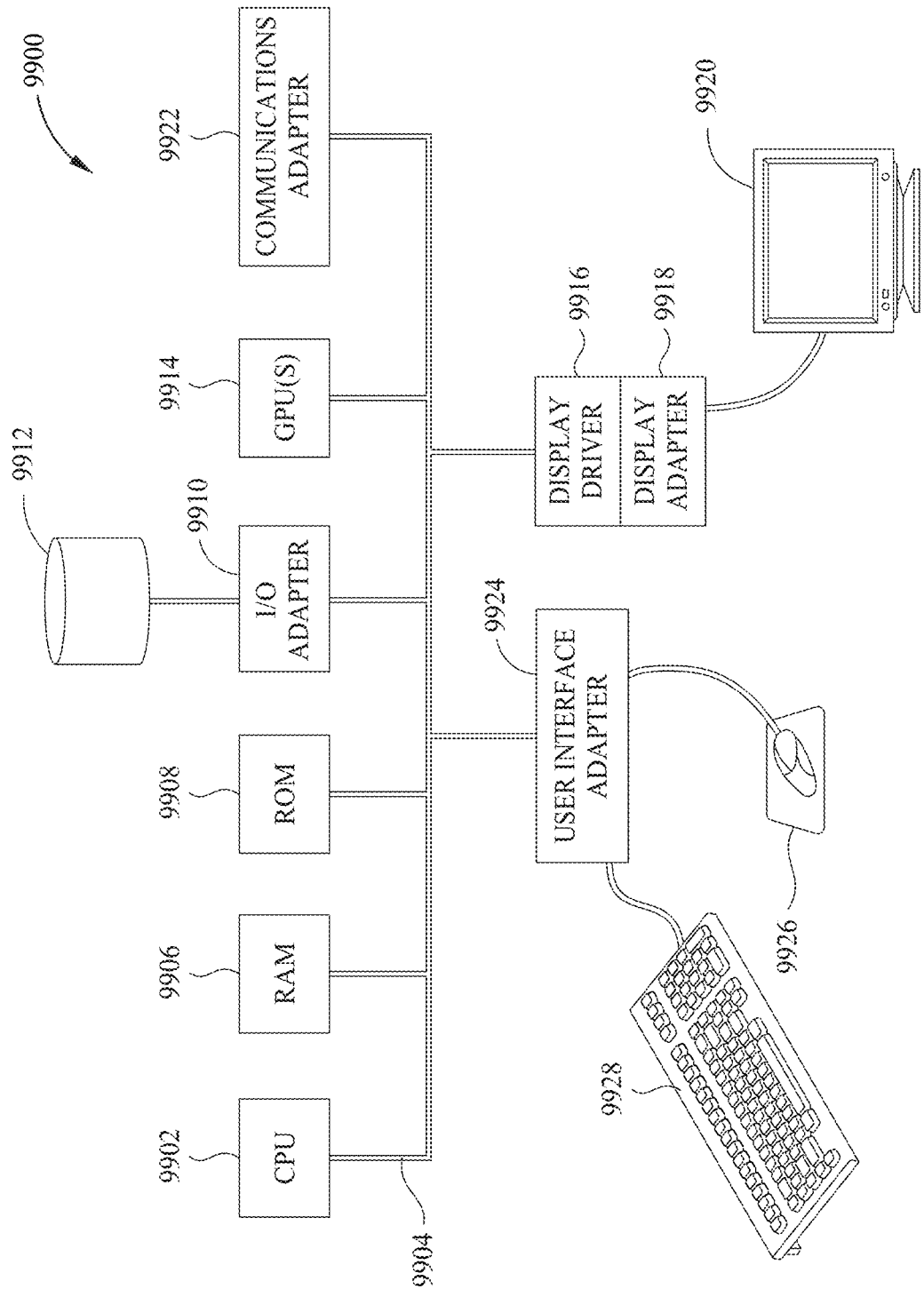
FIG. 8 illustrates a block diagram of a seismic data analysis system upon which a hybrid RMO error-estimation workflow may be embodied.

FIG. 8 illustrates a block diagram of a seismic data analysis system 9900 upon which the present technological advancement may be embodied. A central processing unit (CPU) 9902 is coupled to system bus 9904. The CPU 9902 may be any general-purpose CPU, although other types of architectures of CPU 9902 (or other components of exemplary system 9900) may be used as long as CPU 9902 (and other components of system 9900) supports the operations as described herein. Those of ordinary skill in the art will appreciate that, while only a single CPU 9902 is shown in FIG. 8, additional CPUs may be present. Moreover, the system 9900 may comprise a networked, multi-processor computer system that may include a hybrid parallel CPU/GPU system. The CPU 9902 may execute the various logical instructions according to various teachings disclosed herein. For example, the CPU 9902 may execute machine-level instructions for performing processing according to the operational workflow described.

The seismic data analysis system 9900 may also include computer components such as non-transitory, computer-readable media. Examples of computer-readable media include a random access memory (RAM) 9906, which may be SRAM, DRAM, SDRAM, or the like. The system 9900 may also include additional non-transitory, computer-readable media such as a read-only memory (ROM) 9908, which may be PROM, EPROM, EEPROM, or the like. RAM 9906 and ROM 9908 hold user and system data and programs, as is known in the art. The system 9900 may also include an input/output (I/O) adapter 9910, a communications adapter 9922, a user interface adapter 9924, and a display adapter 9918; the system 9900 may potentially also include one or more graphics processor units (GPUs) 9914, and one or more display drivers 9916.

The I/O adapter 9910 may connect additional non-transitory, computer-readable media such as storage device(s) 9912, including, for example, a hard drive, a compact disc (CD) drive, a floppy disk drive, a tape drive, and the like to seismic data analysis system 9900. The storage device(s) may be used when RAM 9906 is insufficient for the memory requirements associated with storing data for operations of the present techniques. The data storage of the system 9900 may be used for storing information and/or other data used or generated as disclosed herein. For example, storage device(s) 9912 may be used to store configuration information or additional plug-ins in accordance with the present techniques. Further, user interface adapter 9924 couples user input devices, such as a keyboard 9928, a pointing device 9926 and/or output devices to the system 9900. The display adapter 9918 is driven by the CPU 9902 to control the display on a display device 9920 to, for example, present information to the user. For instance, the display device may be configured to display visual or graphical representations of any or all of the models discussed herein (e.g., CIG gathers, velocity models, RMO error estimations, labeling scatter plots). As the models themselves are representations of geophysical data, such a display device may also be said more generically to be configured to display graphical representations of a geophysical data set, which geophysical data set may include the models described herein, as well as any other geophysical data set those skilled in the art will recognize and appreciate with the benefit of this disclosure.

The architecture of seismic data analysis system 9900 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the system 9900 may include various plug-ins and library files. Input data may additionally include configuration information.

Seismic data analysis system 9900 may include one or more machine learning architectures. The machine learning architectures may be trained on various training data sets. The machine learning architectures may be applied to analysis and/or problem solving related to various unanalyzed data sets. It should be appreciated that the machine learning architectures perform training and/or analysis that exceed human capabilities and mental processes. The machine learning architectures, in many instances, function outside of any preprogrammed routines (e.g., varying functioning dependent upon dynamic factors, such as data input time, data processing time, data set input or processing order, and/or a random number seed). Thus, the training and/or analysis performed by machine learning architectures is not performed by predefined computer algorithms and extends well beyond mental processes and abstract ideas.

The above-described techniques, and/or systems implementing such techniques, can further include hydrocarbon management based at least in part upon the above techniques. For instance, methods according to various embodiments may include managing hydrocarbons based at least in part upon hybrid RMO error estimations constructed according to the above-described methods. In particular, such methods may include drilling a well, and/or causing a well to be drilled, based at least in part upon the hybrid RMO error estimations (e.g., such that the well is located based at least in part upon a location determined from the hybrid RMO error estimations, which location may optionally be informed by other inputs, data, and/or analyses, as well) and further prospecting for and/or producing hydrocarbons using the well.

The foregoing description is directed to particular example embodiments of the present technological advancement. It will be apparent, however, to one skilled in the art, that many modifications and variations to the embodiments described herein are possible. All such modifications and variations are intended to be within the scope of the present disclosure, as defined in the appended claims.

The invention claimed is:

1. A method for estimating RMO error, comprising:
   obtaining input data comprising a domain of picking locations;
   running a plurality of residual moveout (RMO) error picking algorithms with the input data;
   for each of the plurality of RMO error picking algorithms, flattening gathers based on the respective RMO error picking algorithms to generate a resultant error pick;
   comparing the resultant error picks from the plurality of RMO error picking algorithms at each picking location in the domain of picking locations; and
   assembling a set of final RMO error picks from the resultant error picks from the plurality of RMO error picking algorithms at each picking location.

2. The method of claim 1, further comprising preparing the input data before running the plurality of RMO error picking algorithms, wherein the preparing comprises at least one of:
   cleaning the input data;
   filtering the input data; and
   scaling the input data.

3. The method of claim 1, wherein the RMO error picking algorithms comprise at least one of:
   a gamma scanning-based method;
   a structure tensor-guided method;
   a semblance-based method;
   a cross-correlation-based method;
   a dynamic warping-based method;
   a plane wave destructor-based method;
   a probability neural network-based method;
   an AB semblance-based method; and
   an eigenvalue-based coherence method.

4. The method of claim 1, further comprising generating an image from the set of final RMO error picks.

5. The method of claim 4, wherein generating the image comprises a tomographic inversion.

6. The method of claim 4, further comprising managing hydrocarbons based on the image.

7. The method of claim 1, further comprising running at least two of the plurality of RMO error picking algorithms simultaneously.

8. The method of claim 1, further comprising:
   based on the comparing, selecting one error pick from the resultant error picks from the plurality of RMO error picking algorithms at each picking location,
   wherein the assembling comprises assigning the selected error pick at each pick location to the set of final RMO error picks.

9. A method for estimating RMO error, comprising:
   obtaining production data comprising a domain of picking locations;
   selecting a training data set from the production data; and
   training a machine learning system by:
   running a plurality of residual moveout (RMO) error picking algorithms with the training data set;
   for each of the plurality of RMO error picking algorithms, flattening gathers based on the respective RMO error picking algorithms to generate a resultant training error pick;
   extracting features from each of the resultant training error picks;
   comparing the resultant training error picks from the plurality of RMO error picking algorithms at each picking location in the domain of picking locations;
   based on the comparing, assigning a label representative of the resultant training error picks at each picking location; and
   calculating hyperparameters at each picking location based on the extracted features and assigned labels.

10. The method of claim 9, further comprising running at least two of the plurality of RMO error picking algorithms simultaneously.

11. The method of claim 9, wherein the extracted features comprise at least one of:
    weighted semblance difference attributes;
    average linearity attributes;
    signal-to-noise ratio attributes;
    depth attributes; and
    dominant frequency attributes.

12. The method of claim 9, further comprising:
    selecting a validation data set from the production data; and
    validating the training of the machine learning system by:
    running the plurality of RMO error picking algorithms with the validation data set;
    for each of the plurality of RMO error picking algorithms, flattening gathers based on the respective RMO error picking algorithms to generate a resultant validation error pick;
    extracting features from each of the resultant validation error picks; and
    applying the hyperparameters with the extracted features at each picking location to predict labels at each picking location.

13. The method of claim 12, wherein validating the training further comprises:
    comparing the predicted labels with the assigned labels at each picking location to assess performance of the machine learning system;
    if the performance is unsatisfactory, repeating until the performance is satisfactory:
    selecting an additional training data set;
    repeating the training of the machine learning system to generate adjusted assigned labels and adjusted hyperparameters;
    applying the adjusted hyperparameters with the extracted features at each picking location to predict adjusted labels at each picking location; and
    comparing the adjusted predicted labels with the adjusted assigned labels at each picking location to assess performance of the machine learning system.

14. The method of claim 13, further comprising assembling a set of final validation RMO error picks for the validation data set from the resultant validation error picks and the adjusted predicted labels at each picking location.

15. The method of claim 9, further comprising:
    applying the trained machine learning system to the production data set by:
    running the plurality of RMO error picking algorithms with the production data set;

for each of the plurality of RMO error picking algorithms, flattening gathers based on the respective RMO error picking algorithms to generate a resultant production error pick;

extracting features from each of the resultant production error picks;

applying the hyperparameters with the extracted features at each picking location to predict labels at each picking location; and assembling a set of final production RMO error picks from the resultant production error picks from the plurality of RMO error picking algorithms at each picking location.

16. The method of claim 15, further comprising generating an image from the set of final production RMO error picks.

17. The method of claim 16, wherein generating the image comprises a tomographic inversion.

18. The method of claim 16, further comprising managing hydrocarbons based on the image.

19. A machine learning system for estimating RMO error, comprising:
a processor configured to:
obtain production data comprising a domain of picking locations;
select a training data set from the production data; and
train the machine learning system by:
running a plurality of residual moveout (RMO) error picking algorithms with the training data set;
for each of the plurality of RMO error picking algorithms, flattening gathers based on the respective RMO error picking algorithms to generate a resultant training error pick;
extracting features from each of the resultant training error picks;
comparing the resultant training error picks from the plurality of RMO error picking algorithms at each picking location in the domain of picking locations;
based on the comparing, assigning a label representative of the resultant training error picks at each picking location; and
calculating hyperparameters at each picking location based on the extracted features and assigned labels.

20. The machine learning system of claim 19, wherein the processor is further configured to:
select a validation data set from the production data; and
validate the training of the machine learning system by:
running the plurality of RMO error picking algorithms with the validation data set;
for each of the plurality of RMO error picking algorithms, flattening gathers based on the respective RMO error picking algorithms to generate a resultant validation error pick;
extracting features from each of the resultant validation error picks; and
applying the hyperparameters with the extracted features at each picking location to predict labels at each picking location.

21. The machine learning system of claim 19, wherein the processor is further configured to:
apply the trained machine learning system to the production data set by:
running the plurality of RMO error picking algorithms with the production data set;
for each of the plurality of RMO error picking algorithms, flattening gathers based on the respective RMO error picking algorithms to generate a resultant production error pick;
extracting features from each of the resultant production error picks;
applying the hyperparameters with the extracted features at each picking location to predict labels at each picking location; and
assembling a set of final production RMO error picks from the resultant production error picks from the plurality of RMO error picking algorithms at each picking location.

22. The machine learning system of claim 21, wherein:
the processor is further configured to generate an image from the set of final production RMO error picks; and
the machine learning system further comprises a display configured to display the image.

23. The machine learning system of claim 22, wherein, to generate the image, the processor is further configured to run a tomographic algorithm.

\* \* \* \* \*